Sept. 19, 1933. J. E. SCHEEL ET AL 1,927,758
DEVICE FOR INDICATING THE LEVEL OF LIQUIDS
Filed July 2, 1928
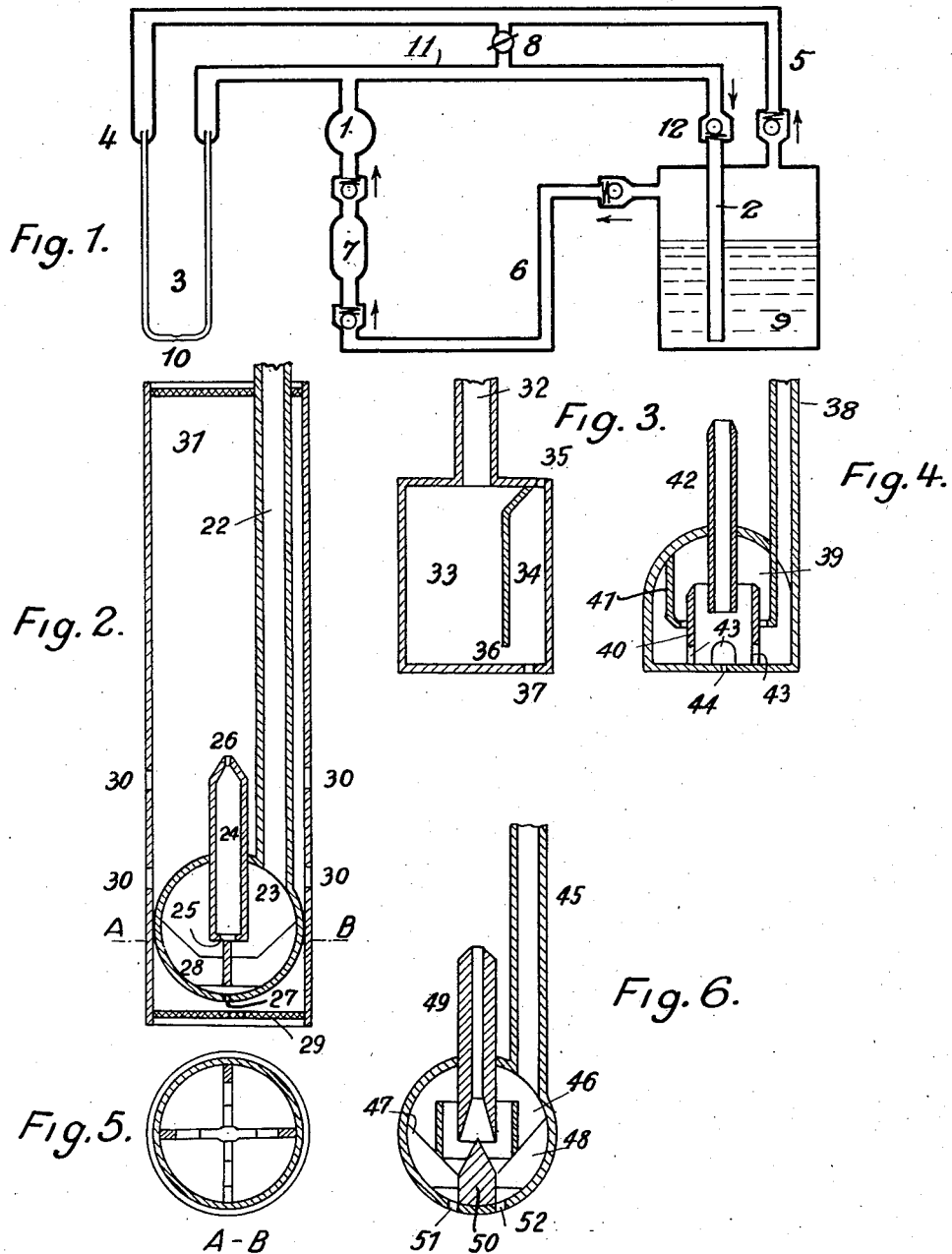

Patented Sept. 19, 1933

1,927,758

UNITED STATES PATENT OFFICE 1,927,758

DEVICE FOR INDICATING THE LEVEL OF LIQUIDS

Joachim Erik Scheel, Karlsruhe, Werner Herbert Bull, Durlach, and Rudolf Carl von Freydorf, Karlsruhe, Germany Application July 2, 1928, Serial No. 289,883, and in Germany July 23, 1927

5 Claims. (Cl. 73—54)

This invention relates to a device for indicating the level of liquids.

In order to measure the momentary liquid level in closed containers of known dimensions it is known to employ a pipe which is immersed almost to the bottom of the container and to expel a gas under pressure through the immersed pipe the gas bubbling up through the liquid in the container. The difference in pressure of the gas passed into the immersed pipe and at the level of the liquid is a measure of the height of the liquid level in the container.

The known devices of this description fail however when measuring the level of liquids contained in moving containers and which in consequence are considerably agitated for example in oil and petrol tanks on aircraft or on motor vehicles. When measuring the level of liquids in such containers the immersed pipe must be so formed that transitory fluctuations in pressure in the event of vibrations or flows do not substantially affect the pressure gauge adjustment.

According to the present invention the immersed pipe is formed as a chamber or system of chambers having one or more openings. The chambers and openings in the system of chambers at the end of the immersed pipe are so dimensioned and fitted with partitions that the dividing surface between the gas and the liquid inside the system of chambers lies below the highest level at which the gas passes out of the chamber system. A capillary action at the dividing surface is if possible avoided, or if it is expressly utilized, it is maintained practically constant by suitably dimensioning the chamber part determining the dividing surface between the gas and the liquid. The dividing surface between the gas and liquid in the chamber is made as large as possible. In addition a suitable damping in the movement of the dividing surface at this point is brought about. Independently of the conditions immediately on the dividing surface, a suitable damping of the movements of the inflowing and outflowing gases and liquids is effected by the formation of the chambers or the system of chambers and by the dimensions of the openings, that is, the discharge of gas and liquid is throttled. Finally care is taken that the difference in pressure, which exists between the dividing surface in the chamber and the level of the liquid in the container even in the event of fluctuations is maintained so long as possible.

The invention is illustrated by way of example in the accompanying drawing wherein:

Fig. 1 illustrates diagrammatically a device for indicating or measuring the level of liquids in containers.

Figures 2, 3, 4 and 6 illustrate, in vertical section, details of various forms of my invention, while;

Figure 5 is a cross section taken on the line A—B of Figure 2.

In Fig. 1, 1 is an excess pressure container which if necessary is connected to pipe 11. 2 is the immersed pipe shown without chambers and 3 is a pressure gauge which if desired may also be given other forms of construction and may for example be constructed so that its scale renders possible a linear reading of the liquid content to be measured in containers of any desired form. 10 is a damping point for the pressure gauge. 5 is a connecting pipe between one side of the pressure gauge and the gas over the level of the liquid in the container. If the latter is under atmospheric pressure only, the connecting pipe may be dispensed with. 6 is a connecting pipe between a pressure producer 7 and the gas in the space over the liquid the level of which is to be measured. This connecting pipe as in the case of pipe 5 may be dispensed with. If the pipe 6 is present, it serves to take the pressure gas out of the liquid container, so that it is not necessary at each measuring to blow unsaturated gas through the liquid, this fresh gas being not saturated with liquid vapor. 8 is a cock for equalizing the pressure between pipes 5 and 11. 9 is the container within which is the liquid to be measured and 12 is a non-return valve and flow regulator valve.

The "non-return valves" are indicated diagrammatically in Fig. 1 by their chamber and by the valve core shown as a circle. The contact surface of the seat of the valve is shown as a conical part of the valve chamber, the valve core being illustrated as being pressed by spring pressure against the seat. It follows therefrom that the direction of flow in each of the one-way valves extends from the conical side to the flat side of the chamber. The valves are opened during the action of the pump by the pressure of air.

Figs. 2 and 6 illustrate by way of example the manner in which the end of the immersed pipe can be formed as a system of chambers according to the invention. As shown the immersed pipe 22 has a ball-shaped chamber 23 at the end thereof the dimensions of the pipe and chamber being dependent upon the volume of gas to be expelled during measuring. 24 is a second pipe chamber by an opening 25 of which the liquid enters to a height determining the dividing surface between gas and fluid, whilst the over-flowing gas escapes through opening 26. 27 is an opening permitting communication between the liquid inside and outside the chamber 23. 28 are ribs or nets for the suppression of oscillations of the liquid inside the chamber 23.

The size and geometrical shape of the opening 25 is determined in conjunction with the diameter of the ball-shaped chamber 23 at this point so that having regard to the nature of the liquid and the material used in construction the capillary action is substantially constant. At the opening 27 no capillary action occurs as it adjusts liquid against liquid. By means of this opening 27 incorrect measurements are avoided even though during static measuring a gas bubble should be caught in the pipe chamber 24 or should escape from same in case of vibrations.

For all kinds of immersed pipe embodiments it is desirable to protect the holes against fouling by means of sieves, such as 29. Moreover by means of a further chamber 31 with openings 30 therein the condition can be fulfilled that the difference in pressure serving as standard for the measurements is maintained even in the case of violent oscillations. By means of the chamber 31 a determined path through the liquid can also be imparted to the escaping gas.

Fig. 3 illustrates a further embodiment of the invention in which 32 is the immersed pipe having at the end thereof a chamber 33 which communicates by a hole 36 with a chamber 34 the hole 36 serving to conduct the escaping gas into the chamber 34 whence it can escape through opening 35 while the liquid flows through opening 37.

Fig. 4 illustrates a further embodiment of the invention in which 38 is the immersed pipe having a chamber 39 at the end thereof sub-divided by partitions 40 and 41. 42 is a gas outlet pipe whilst 43 and 44 are openings for equalizing the liquid pressure. In the case of excessive initial gas pressure the latter serve for equalizing the gas pressure.

In Fig. 6, 45 is the immersed pipe which terminates in a chamber 46 which is sub-divided by partitions 47 and 48 and a cone 50. 49 is a gas outlet pipe and 51 and 52 are openings for equalizing the liquid pressure.

In all these fluid level measuring devices it is, under certain circumstances, an advantage, particularly in the case of readily evaporating and condensing liquids to close during the period of rest the immersed pipe above the level of the liquid and if necessary also the other pipe discharging into the liquid container by means of cocks, valves or the like.

The measuring of the liquid level can in all cases be effected either statically or dynamically while the gas is streaming. For measuring the momentary height of the liquid level a single filling of the excess pressure container and readjing of the pressure indicator suffices after equalization of the gas pressure (static measurement) has been effected. In the case of decreasing liquid level the pressure gauge indication is effected automatically. In the case of increasing or fluctuating liquid level continuous succession of the pressure gauge indication (dynamic measurement) can be attained by a weak stream of gas continuously passed through the immersed pipe. This continuous stream of gas may be produced by a continuously moving pump or it may be taken from a compressed air bottle.

What we claim is:—

1. An apparatus for measuring the liquid level in containers, comprising a container for the liquid, an immersed pipe extending almost to the bottom of said container, and opening into said liquid, means for expelling said liquid out of the pipe with the aid of a compressed gas, means for measuring the pressure necessary therefor, and a chamber which is fitted with partitions, in which the bottom end of the said pipe terminates, and having an opening at its top through which the pressure gas passes from the chamber, this opening being so dimensioned as to throttle the discharge of gas and liquid, the dividing surface between the gas and the liquid to be measured normally lying below said opening.

2. An apparatus for measuring the liquid level in containers comprising a container for the liquid, an immersed pipe extending almost to the bottom of said container, and opening into said liquid, means for expelling said liquid out of the pipe with the aid of a compressed gas, and means for measuring the pressure necessary therefor, a plurality of communicating chambers, fitted with partitions, in one of which the pipe terminates, said chambers having a plurality of openings, which are so dimensioned as to throttle the discharge of gas and liquid, the dividing surface between the gas and the liquid to be measured normally lying below said openings.

3. An apparatus for measuring the liquid level in containers, comprising a container for the liquid, an immersed pipe extending almost to the bottom of said container, means for expelling said liquid out of the pipe with the aid of a compressed gas, means for measuring the pressure necessary therefor, and a chamber fitted with partitions in which the bottom end of the said pipe terminates and having a small opening at its top through which the pressure gas passes from the chamber into the container so that the discharge of gas and liquid is throttled, the dividing surface between the gas and the liquid to be measured lying below said opening.

4. An apparatus for measuring the liquid level in containers, comprising a container for the liquid, an immersed pipe extending almost to the bottom of said container, means for expelling said liquid out of the pipe with the aid of a compressed gas, and means for measuring the pressure necessary therefor, the pipe terminating in one of a plurality of communicating chambers fitted with partitions and having a plurality of diminished openings communicating with the container, so that the discharge of gas and liquid is throttled, the dividing surface between the gas and the liquid to be measured lying below said openings.

5. An apparatus for measuring the liquid level in containers, comprising a container for the liquid, an immersed pipe extending almost to the bottom of said container, means for expelling said liquid out of the pipe with the aid of a compressed gas, means for measuring the pressure necessary therefor, a chamber fitted with partitions in which the bottom end of the said pipe terminates and having a small opening at its top through which the pressure gas passes from the chamber into the container, so that the discharge of gas and liquid is throttled, the dividing surface between the gas and the liquid to be measured lying below said opening, and means whereby the gas escaping from the chamber is caused to traverse a predetermined path through the container liquid.

JOACHIM ERIK SCHEEL.
WERNER HERBERT BULL.
RUDOLF CARL v. FREYDORF.